United States Patent [19]
Lane

[11] Patent Number: 4,815,827
[45] Date of Patent: Mar. 28, 1989

[54] OPTICAL SWITCH STRUCTURES

[75] Inventor: Charles H. R. Lane, Watford, England

[73] Assignee: The General Electric Company, p.l.c., England

[21] Appl. No.: 23,203

[22] Filed: Mar. 9, 1987

[30] Foreign Application Priority Data

Mar. 12, 1986 [GB] United Kingdom ............... 8606154

[51] Int. Cl.$^4$ .............................................. G02F 1/133
[52] U.S. Cl. .................................. 350/347 V; 350/338; 350/96.13; 350/96.14
[58] Field of Search ........... 350/347 V, 347 R, 347 E, 350/338, 342, 385, 388, 169, 96.14, 96.13

[56] References Cited

U.S. PATENT DOCUMENTS 4,278,327 7/1981 McMahon et al. ............. 350/347 V
4,516,837 3/1985 Soref et al. ..................... 350/347 V

FOREIGN PATENT DOCUMENTS 0015139 9/1980 European Pat. Off. ........ 350/347 V

Primary Examiner—Stanley D. Miller
Assistant Examiner—Tai V. Duong
Attorney, Agent, or Firm—Kirschstein, Kirschstein, Ottinger & Israel

[57] ABSTRACT

A multi-input/output optical switch structure comprises a pair of parallel, inwardly facing main mirror elements 24, 25 and mounted equidistant between the main mirror elements is a co-linear array of optical switching units 40. To provide the multi-switching function and to compensate for the fact that the switch units are in a colinear array there are a plurality of additional mirror elements (41,42,43,44) mounted between the linear array and one main mirror element.

2 Claims, 2 Drawing Sheets

OPTICAL SWITCH STRUCTURES

BACKGROUND OF THE INVENTION

1. Field of the Invention

The present invention concerns optical switches, and in particular optical switches for receiving two or more light inputs and being capable of switching them between two or more outputs.

The switches with which the present invention is concerned incorporate switching units of the kind having an interface which is arranged either to allow the passage of a light-ray or to cause its reflection. Such switching units will be more fully described hereinafter and usually include a liquid crystal material.

2. Description of Related Art

It is known to fabricate a structure incorporating a plurality of such switch units so that input signals can be switched over a range of outputs.

SUMMARY OF THE INVENTION

The present invention has for an object to provide such a structure which is simpler to fabricate than prior structures and which also incorporates a low degree of cross-talk.

Accordingly, the present invention consists in a switching structure for switching at least two input light rays between at least two outputs, and comprising a plurality of individual switch units each including a reflective/transmissive interface, the units being mounted in a single linear array between two main mirror elements, and wherein at least one additional mirror element is included between the linear array and one of the main mirror elements.

BRIEF DESCRIPTION OF THE DRAWINGS

In order that the present invention may be more readily understood, some embodiments thereof will now be described by way of example and with reference to the accompanying drawings, in which.

DETAILED DESCRIPTION OF THE PREFERRED EMBODIMENTS

Figure 1:
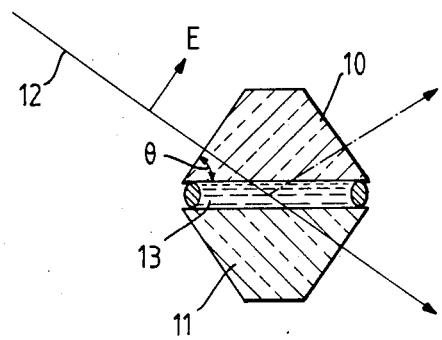
FIG. 1 is a diagrammatic section through a single electro-optical switch.

Referring now to drawings the optical switching cell shown in FIG. 1 comprises a pair of prisms 10 and 11 in the shape of prism trapeziums. A ray of polarised light 12 enters an input face of prism 10 at right angles thereto and travels through the prism undeviated until it reaches the liquid crystal interface 13. The molecules of the liquid crystal interface possess positive dielectric anisotropy. This interface is bounded by adjacent surfaces of prisms 10 and 11 which also carry transparent electrodes. The prisms 10 and 11 are of glass and the refractive index of the glass is chosen to be very close to the extraordinary index of refraction of the liquid crystal. The extraordinary index of refraction of the liquid crytal interface occurs when an electrical potential is applied across the transparent electrodes. In this case the liquid crystal molecules align with this electric field to provide a higher refractive index than that which occurs in the absence of an electrical potential. Thus in the ON stage of the switch the polarised ray of light passes through the liquid crystal interface and in the absence of any optical discontinuity passes out of prism 11 via the solid line.

However, when the electrical potential is removed, the liquid crystal molecules align parallel to the adjacent glass prism surfaces. The ray of polarised light now sees the lower of the two liquid crystal refractive indices so that it is totally internally reflected and passes out of prism 10 along the line shown in chain dots. Optical switches of this kind are well known and can be combined to form switching structures. Such a structure is shown in FIG. 2 of the accompanying drawings.

Figure 2:
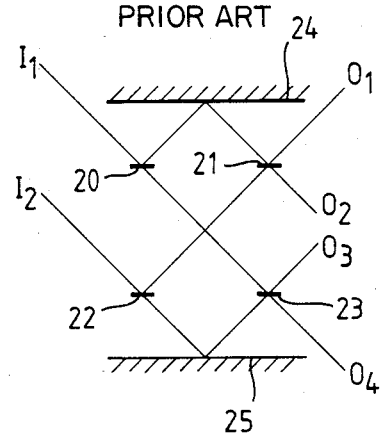
FIG. 2 is a diagram showing a known type of 2×4 optical switch structure according to the Prior Art.

FIG. 2 shows a 2 input/4 output (2×4) switching structure incorporating 4 switches 20, 21, 22 and 23 of the kind described with reference to FIG. 1. The four switches are arranged between two mirrors 24, 25 in two layers. The two input paths are shown in $I_1$ and $I_2$. It will be seen that an input ray of light starting at $I_1$ will initially strike switch 20. According to the state of switch 20 it will either pass straight through 20 to strike switch 23 or will be reflected to strike mirror 24 and then switch 21. In either of these two paths there is again the option of transmission or reflection in accordance with the state of the relevant optical switch. Thus according to the setting of switches 20, 21 and 23 the $I_1$ light beam can be switched to any one of the four output paths $O_1$, $O_2$, $O_3$ and $O_4$. An $I_2$ light beam can be switched in an exactly analogous manner. It can also be seen that whatever the input and output patterns required, there will be not 'blocking' or common paths between two simultaneously occurring input signals.

However, the arrangement shown in FIG. 2 is relatively complex to manufacture because of the two layers of switches between the outer mirrors. This complexity is greatly increased if it is wished to switch between 4 or more input rays to 4 or more output arrays. This problem is alleviated in the structure shown in FIG. 3 of the drawings. In this structure the four switches 20-23 are arranged in a single plane. An additional mirror is provided at 30, but otherwise corresponding parts have been given the same reference numerals. As in the FIG. 2 structure each input ray of light can follow one of four paths in accordance with the states of the four optical switches. Also there is no blocking between simultaneous input rays.

Figure 4:
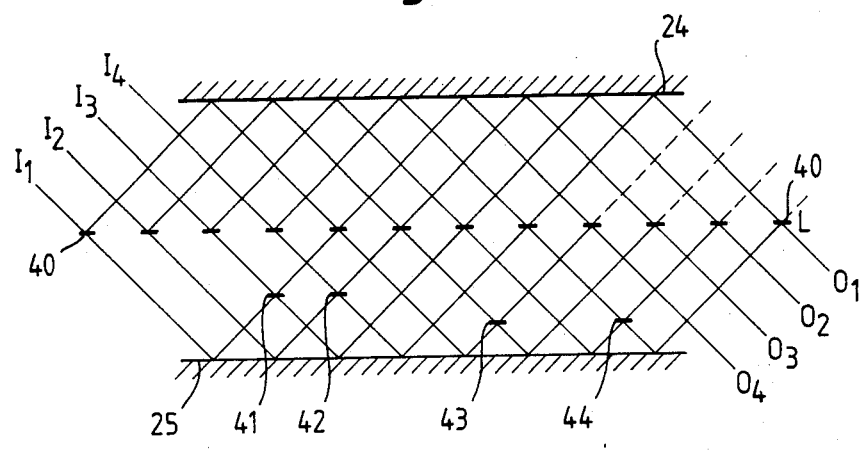
FIG. 4 is another diagram showing a 4×4 optical switch structure according to the present invention.

FIG. 4 shows a 4×4 switching structure. This employs 12 optical switches 40 and two pairs of additional mirrors 41, 42 and 43, 44. Although only 4 outputs $0_1$, $O_2$, $O_3$ and $O_4$ are shown it will be appreciated that four further outputs could be available in the direction shown in the dotted lines. This would convert the switching structure into a 4×8 switch. However, in this condition it could not be ensured that there would be no blocking or interference between simultaneous input rays.

Figure 3:
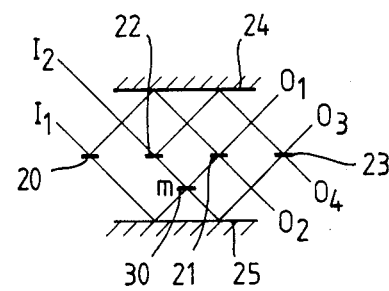
FIG. 3 is a diagram similar to FIG. 2 showing a 2×4 optical switch structure according to the present invention.

There is a logical connection between coplanar arrays of the kind shown in FIGS. 3 and 4 and the biplanar array of FIG. 2 and by following a sequence of logical steps it is possible to see the relationship between the biplanar, known array shown in FIG. 2, and the coplanar arrays of the present invention. It is thus possible to create arbitrary size coplanar switching structures out of the basic multiplanar structures, the simplest of which is as shown in FIG. 2.

This is done by firstly identifying the plane of symmetry in the basic structure which in FIG. 2 lies midway between mirrors 24, 25. The bottom two switching units 22, 23 are then shifted to the right by half the distance between units 20, 21 and the shifted bottom two units 22, 23 are reflected about the plane of symmetry so that the units 22, 23 become coplanar with units 20, 21 with unit 22 lying between units 20, 21.

Merely carrying out this procedure will not in itself create the equivalent path structure for the light beams. In order to achieve this an additional mirror has to be added which lengthens the path between units 20 and 23 by the amount by which the bottom half was shifted and on the other side shortens the path between units 22, 21 by the same amount. The additional mirror is thus located midway between the plane of units 20, 21, 22 and 23 and the lower main mirror 25.

The same process can be repeated to reach the structure in FIG. 4. However, in this case the correction of the path lengths to make them correspond to the original multi-planar structure and retain the original logical structure requires a still further additional mirror. In the 2×4 coplanar structure the additional mirror lies midway between the switching unit array and the lower main mirror, in the 4×4 structure the additional mirrors lie in two planes, one before midway between the switching unit array and the lower main mirror, and the second midway between the first plane containing the additional mirrors and the lower main mirror.

As the size of the switching structure increases and more additional mirrors have to be added to maintain the path lengths of the basic multiplanar structures and their logic structures it will be found that each new planar array of additional mirrors will follow the pattern of being half-way between the lower main mirror and the lowest previous additional mirror layer.

Figure 5:
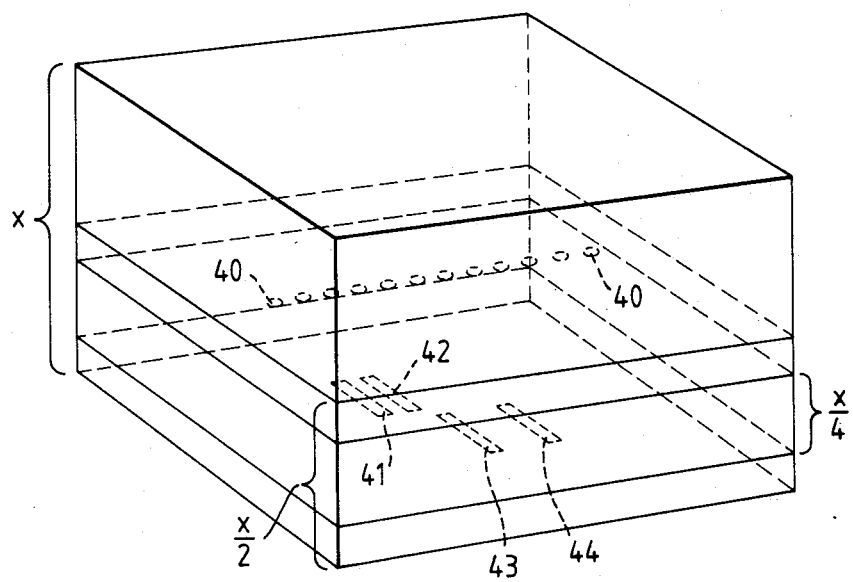
FIG. 5 is a diagrammatic perspective view of an optical switch structure again constructed in accordance with the present invention.

Referring now to FIG. 5, this perspective view is given so that the nature of the structure shown in FIG. 4 can be more easily appreciated. This drawing is substantially simplified as the incident and switched light means require light guides and collimators when being fed into and led out from the switching units.

It will be appreciated that although the mirrors have been shown below the plane of switching elements here, the symmetry of the device means that some or all of them could be placed on the other side of the switching element plane at the equivalent positions to those shown below the plane in this direction.

The foregoing description has been entirely concerned with optical switches incorporating liquid crystal interfaces. However, it is entirely possible that the coplanar switching structures described herein can utilise other types of interface which can be switched between reflective and transmissive states. Such an interface can be provided by a movable reflective film or liquid dielectric. Thus under the control of an applied voltage the film or liquid dielectric can be moved from one position in which it allows transmission of a light ray to another in which the light ray is reflected.

I claim:

1. An optical switch structure for switching two input light rays between two outputs, and comprising:
   (a) first and second main mirror surfaces which are parallel, face each other and are spaced apart by a distance L;
   (b) a linear array of four individual optical switch units mounted in a plane of symmetry between said first and second main mirror surfaces, each optical switch including a switchable transmissive/reflective interface; and
   (c) an additional mirror element mounted at a distance L/4 from one of said main mirror surfaces, and located on a line perpendicular to said main mirror surfaces and passing through a mid-point of said linear array.

2. An optical switch structure for switching four input light rays between two outputs, and comprising:
   (a) first and second main mirror surfaces which are parallel, face each other and are spaced apart by a distance L;
   (b) a linear array of twelve individual optical switch units mounted in a plane of symmetry between said first and second main mirror surfaces, each optical switch including a switchable transmissive/reflective interface; and
   (c) four additional mirror elements, of which two are mounted at a distance L/4 from one of said main mirror surfaces, and the remaining two additional mirror elements being spaced by a distance L/8 from said one main mirror surface.

* * * * *